United States Patent
Glatzel et al.

[11] 3,994,576
[45] Nov. 30, 1976

[54] OBJECTIVE LENS SYSTEM WITH FIVE ELEMENTS

[75] Inventors: Erhard Glatzel, Heidenheim (Brenz); Heinz Zajadatz, Essingen, both of Germany

[73] Assignee: Carl Zeiss-Stiftung, Oberkochen, Germany

[22] Filed: Apr. 17, 1975

[21] Appl. No.: 569,014

[30] Foreign Application Priority Data
Apr. 20, 1974 Germany.......................... 2419140

[52] U.S. Cl................................. 350/223; 350/176
[51] Int. Cl.² ........................................... G02B 9/34
[58] Field of Search............................ 350/223, 176

[56] References Cited
UNITED STATES PATENTS
3,390,936  7/1968  Price ............................. 350/223 X FOREIGN PATENTS OR APPLICATIONS
1,190,216  4/1965  Germany ......................... 350/223
46-26670   2/1968  Japan............................. 350/223

*Primary Examiner*—Paul A. Sacher
*Attorney, Agent, or Firm*—Stonebraker, Shepard & Stephens

[57] ABSTRACT

An objective of the expanded Tessar type, having five elements constituting four components (two of the elements being cemented to each other to form one component), all of the components being air spaced from each other. The front two components (in the direction from the object or long conjugate side toward the image or short conjugate side) are both positive. Numerical limits or ranges are given, for certain designated features of the lens system. If a lens of this type is so designed that the designated features fall within the specified ranges, improved results are attained.

15 Claims, 1 Drawing Figure

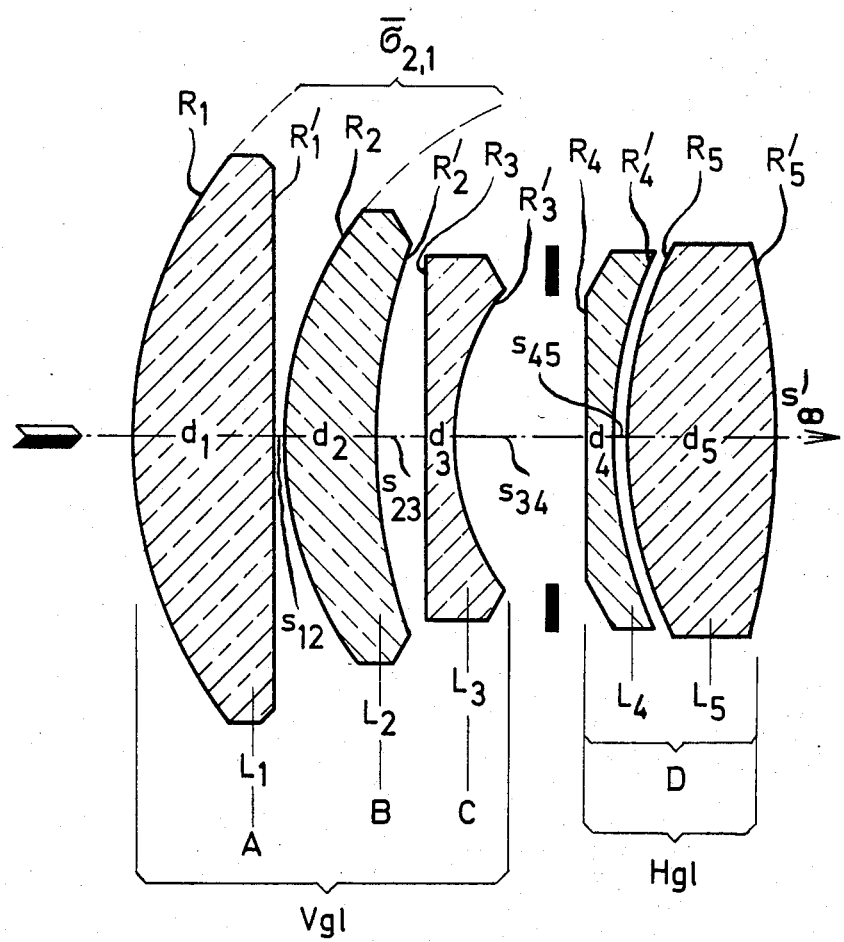

OBJECTIVE LENS SYSTEM WITH FIVE ELEMENTS

BACKGROUND OF THE INVENTION

This invention relates to an objective lens system of what may be called the expanded Tessar type, which type is disclosed, for example, in U.s. Pat. No. 2,105,799. The lens has a front member, designated in the drawing and in the examples as Vgl (standing for the German word Vorderglied) and a rear member designated as Hgl (standing for the German word Hinterglied). The front member is made up of three individually air spaced lens elements, and the rear member is a doublet consisting of two lens elements of opposite sign of power, cemented to each other to constitute a single component. A diaphragm space is provided between the front member and the rear member. The neighboring cemented surfaces of this doublet constituting the rear member constitute a collecting cement surface. In the front member, the front element is an unequal-sided collecting element, followed at a small finite air spacing by a positive meniscus which is convex toward the front and concave toward the rear, this meniscus being followed, in turn, by an unequal-sided negative lens which has its most strongly curved surface in the form of a surface concave toward the rear. A dispersing air lens is formed between the rear surface of the second element and the front surface of the negative lens constituting the third element.

SUMMARY OF THE INVENTION

In a five element objective of the expanded Tessar type, a valuable increase in the picture taking quality of the lens is achieved if, in order to keep the proportion of primary abberrations small, the first pair of collecting lenses into which the rays of light enter from the remote object are both made of glass having a refractive index (for the d-line of the helium spectrum, wavelength 5876 Angstrom units) is greater than 1.6454. The use of such glass for the first two elements fundamentally provides assurance that, from the very start, the refractive index proportional values of these glasses in the aberration coefficients of third order are in the desirable range of less than 2.55 for the coefficient $n/(n-1)$, and less than 6.50 for the coefficient $n^2/(n-1)^2$. These coefficients are respectively referred to hereafter as $x'$ and $x''$. The importance of keeping these values of $x'$ and $x''$ less than 2.55 and 6.50, respectively, can be seen from the well known work by I. C. Gardner, "Application of the algebraic abberration equations to optical design," published as U.S. Bureau of Standards Scientific Paper No. 550, 1927, particularly equation 24 on page 95, and appendix 4, page 201, value column 4.

Values within these limits are known in the art from German patent 1,190,216, but have not been generally recognized in the art as being important, as will be seen from Table I below, which shows these values of the refractive indices for the first two elements of a lens of this same general type, according to typical prior patents, and the resulting coefficient values $x'$ and $x''$, and shows in comparison thereto the corresponding values for the examples of the present invention.

According to the present invention, a lens system of this general type above described should have certain other features or physical characteristics not found in the prior art, which give greatly improved results, when these additional features are within the values or limits stated, the lens otherwise being of the kind described above. These additional features or conditions which are highly desirable, according to the present invention, are the following, which may be regarded as rules of design for the front pair of collecting lenses.

Feature (a). The front radii $R_1$ and $R_2$, respectively of the front positive lens elements $L_1$ and $L_2$, respectively, which are both of convex curvature toward the front, are so dimensioned with such curvature with respect to each other that the reciprocal of Gardner's curvature index is within the range or limits of $+ 0.109$ and $- 0.275$. For further explanation of the Gardner curvature index, see the above cited work by Gardner. The reciprocal of the curvature index for these first two lens elements may be written as $\bar{\sigma}_{2,1}$, which is the quotient of the difference in radii $R_2 - R_1$ divided by the sum of these radii $R_2 + R_1$.

Feature ($b_1$). The relative distribution of the proportional portions of the Petzval picture curvature between the front lens element $L_1$ and the following positive meniscus element $L_2$ is so dimensioned that the difference in the Petzval curvature portions $B - A$ is within the limits or range of $+ 0.124\ \Phi$ and $- 0.599\ \Phi$, wherein $\Phi$ represents the equivalent refractive power of entire lens system. The Petzval curvature portion B is the refractive power of the second lens element divided by the index of refraction of the glass used for this lens, that is, $B = \phi_2 : n_2$. Similarly, the Petzval curvature portion $A = \phi_1 : n_1$. That is, in each case the Petzval curvature portion of a lens element is the corresponding lens power divided by the corresponding index of refraction.

Feature ($b_2$). The quotient ($\overline{\psi}$ BA) of the difference of the above Petzval curvature portions ($B - A$) of these two front collecting lenses divided by the sum ($B + A$) of these two Petzval curvature portions is within the limits or range of $+ 0.089$ and $- 0.625$. In this connection, one may note the recognized theory that the lens power $\phi_x$ for a lens of either glass or air of any order $x$ is equal to the sum of the two associated surface powers $\phi_x + \phi_x'$, in which connection each surface power means $\phi_x = (n_x' - n_x) : R_x$.

BRIEF DESCRIPTION OF THE DRAWING

The single FIGURE of the drawing is a schematic exploded diagram indicating the general configuration of the lens according to the present invention, and is not necessarily drawn to scale, as it is intended to be a schematic representation of all of the various specific embodiments here disclosed, even though the embodiments may differ from each other somewhat in specific dimensions of radii, thicknesses, and spacings.

DESCRIPTION OF THE PREFERRED EMBODIMENTS

As stated above, in connection with feature $a$, an important feature of the invention is the design of the lens system in such a way that the Gardner curvature index is within the limits above stated. Within the stated limits, it may be either positive or negative. Those skilled in the art will immediately recognize, from what has been said above, that if the Gardner curvature index is to be positive, then the front surface $R_1$ of the first lens element $L_1$ must be of greater curvature (that is, of less radius) than the front surface $R_2$ of the positive meniscus lens element $L_2$. Similarly, if it is desired to have a negative value for the Gardner curvature index, then the front surface $R_1$ must be of lesser or weaker curvature (i.e., greater radius) than the surface $R_2$ of the second lens element. If the radii of curvature of the front faces of the first two lense elements are exactly equal, then the Gardner curvature index will be zero.

By dimensioning the lens components to achieve a Gardner curvature index within the limits above specified for feature $a$, a particularly excellent balancing of the dioptric effect on the course of the zonal abberations in the finitely opened parts of the beam of light can be established for the first time for the central and middle region of image field. If the above stated upper limit of a positive value of the Gardner curvature index is exceeded, this would lead to enlargement of the longitudinal aberration deviation in the zonal inner region. If the Gardner curvature index range above stated is exceeded in the negative direction, this would lead to an increase of aberration in the region of the beam cross section close to the edge.

By utilizing also the above stated rule or feature $b_1$ with respect to the Petzval curvature, in conjunction with feature $a$, it is possible to achieve a particularly suitable stretching of the residual image curvature over the extended field of view by dimensioning the lens to comply with feature $b_1$ and at the same time to comply with feature $a$, there is obtained a dioptric action which is both surprising and very excellent, on the course of the image curvature over the entire useful field of view. Dimensioning the two positive lens components $L_1$ and $L_2$ at the front of the lens system (these components also being designated, in the diagram and elsewhere, as components $A$ and $B$) in such a way as to comply with the above stated rule $b_1$ relating to the Petzval image curvature, one achieves for the first time a previously unknown balancing out of the Petzval coefficients to increase the quality of the picture image in a practical manner of carrying out the technical embodiment. Within the range stated for this rule, if one achieves a Petzval coefficient of zero, then we have the coefficient $B$ exactly equal to the coefficient $A$, since the two have the same sign. Such a value of zero is achieved in example 1 given below, as will be observed from Table II.

The extremely great increase in picture quality achieved by dimensioning the lens system to comply simultaneously with the two rules or features $a$ and $b_1$ in a lens system of the expanded Tessar type initially identified above, will be clearly evident to those skilled in the art, after reading the present disclosure, particularly with reference to the widened field of view. It is very important that in the pair of collecting lenses at the front of the objective, the front lens $L_1$ is at a substantially larger distance from the corresponding position of the entrance pupil EP than the positive meniscus $L_2$ which follows this front lens $L_1$. For this reason not only do the collecting front surfaces $R_1$ and $R_2$ of these two collecting lenses act toward producing extremely different beam path lengths up to the stop or diaphragm, but furthermore in this connection the lens coefficients of the Petzval image curvature (and therefore $A$ on the one hand and $B$ on the other hand) also have the particular importance of their position within the course of the beam in their influence on the shape of the two astigmatic image shells and the astigmatism has the angle-corresponding difference in each case between the sagittal and the tangential image point in the lateral course of these image shells. The above mentioned position of the entrance pupil refers to the image of the diaphragm produced by the lens elements in front of the diaphragm, considered in a direction forwardly (opposite to the direction of incoming light) from the location of the stop of diaphragm.

In order to make clear in particular this previously generally insufficiently known optical event even for the zonal astigmatic beam course, it may be stated here, under permissible simplification, that in the concrete case of example 3 given below, the front surface vertex of the surface $R_1$ is at a distance of $+0.5062$ F from the image associated with it of the axial base point of the stop or diaphragm, while the axial vertex point of the front surface $R_2$ of the positive meniscus is at a distance from the corresponding image of the location of the stop of only $+0.2531$ F. (F represents the equivalent focal length of the entire lens system.) Therefore this comparison difference for the front lens $L_1$ with respect to that of the positive meniscus $L_2$, is practically exactly twice as great as in the case of the latter, since the quotient of these two comparative values of the associated pupil positions is 1.99991, and thus the beam path lengths, referred to the location of the pupil, of the oblique beams is practically in the ratio of 2:1, for these two characteristic collecting surfaces.

The feature or rule of construction $b_1$ teaches in detail that in its positive range of positions, the dimensioning of the positive meniscus in accordance with the power of refraction and collection of the glass, is to be chosen such that its lens coefficient of the Petzval image curvature $B$ is less than $+0.124\Phi$ greater than the partial coefficient $A$ of the front lens $L_1$. Thus an advantageous relaxation, so important for the obtaining of the advance or improvement, is assured in practice. On the other hand, in the negative range of positions of this feature or rule $b_1$ the Petzval lens coefficient $A$ is greater than the coefficient $B$ of the positive meniscus, and in accordance with the inventive concept, is to be dimensioned in such a manner that its negative numerical value is within the limits or range from zero to $-0.599\Phi$ as compared with the numerical value B meniscus the lens coefficient of the menicus $L_2$, in order to make certain that the beams coming from the object and passing through the pair of collecting lenses are not already imparted by the first element $L_1$ an intolerably high image curvature partial coefficient, which would lead to a rise in zonal aberration of the lateral image shells and thus counteract the intended increase in performance.

Furthermore in accordance with the invention, in order to insure that, without any possibility of doubt, the distribution of the lens partial coefficients of the Petzval image curvature on the two front lens elements $L_1$ and $L_2$ will be advantageous, it is desirable that the lens components be so dimensioned that they fulfill also a third rule or condition stated above as feature $b_2$. This third feature is related to the second feature $b_1$ but is somewhat different therefrom. It relates, as already mentioned above when it was initially stated, to the reciprocal of the image curvature distribution number as the quotient of the difference $B-A$ divided by the sum $B+A$. As already stated above, if this distribution number is positive, it should be within the limits or range of $+0.089$ and zero, and if negative it should be within the limits or range of $-0.625$ and zero.

These three rules or features $a$ and $b_1$ and $b_2$ in their entirety (that is, considering all three rules simultaneously) unequivocally set forth the principle of construction of an objective according to the present invention. It should be recognized, of course, that the numerical limits above stated are subject to the usual tolerance of plus or minus 5%, as customary in the optical design field when stating numerical values or ranges. Also it should be recognized that we are here talking about improvements in a lens system of the extended or expanded Tessar type identified or defined near the beginning of this specification. The herein stated rules or features for improving performance of lens systems of the expanded Tessar type do not necessarily apply to lenses of other types.

From the analysis of the above stated features or rules of construction and a careful consideration of the other information given in this disclosure, it will be apparent to a person skilled in this art, that in agreement with recognized teaching, there is not only a definite redundance provided by following the subsidiary condition $b_2$ for the second main feature $b_1$ but at the same time there is also established a framework of dimensioning which at the same time permits the maintaining of the astigmatism small in the edge portions of the extended lateral field of view. The extreme optical importance for the total picture performance is in this connection now obvious (as a result of the present disclosure) to the person skilled in the art when he bears in mind, in accordance with the recognized but frequently disregarded teaching, that the Petzval theorem is of importance for the image curvature if and only if the the beam combination is punctiform even laterally of the axis. This teaching is stated in the standard reference work "Theorie und Geschichte des Photographischen Objektivs" (Theory and History of Photographic Objectives) by M. von Rohr, published by Julius Springer, Berlin, 1899, page 359, lines 31–34. The expression "punctiform" means that there is concerned a focusing with astigmatism-free combining of the image in the lateral parts of the field of view.

The present new principle of construction with its requirement that all three of the rules or features above stated be simultaneously satisfied, in the very specific type of expanded Tessar lens initially identified, has been fully confirmed in the course of extensive investigations. This principle importantly and surprisingly establishes an advance in the art, and the investigations also show at the same time that before these rules of construction were recognized, it was impossible to realize in practice a great improvement in the picture performance. Before the making of the present invention and the recognition of the importance of simultaneously fulfilling the above stated rules or features, it was at most conceivable to obtain very small and unsubstantial improvements for a certain course of aberration, only by tolerating an extremely detrimental or injurious increase in the aberrations of higher order for the predominant majority of other aberrations in or outside of the central parts of the image. The analysis of the present invention and of the consequences of its dioptric effect make it possible clearly to see that the aberration-free beam courses coming from the object within the pair of collecting lenses arranged at the front of the overall system is to be subjected only to very specifically measured portions of aberrations during its passage through this pair of collecting lenses $L_1$ and $L_2$, since the lens components following these lenses in the direction toward the shorter conjugate or image, otherwise cannot lead to a proper compensation of image aberrations. Hence as a practically necessary consequence, there are disturbing residual aberrations which oppose the desired improvement in the image, and also, if extreme types of glass are used, unavoidable aberrations of higher order which greatly impair the combining of the image, if one does not design the lens in accordance with the inventive principles here disclosed.

There have been previous proposals for increasing the picture performance of the five lens objective of the expanded Tessar type with which the present invention deals. One of these proposals, that disclosed in U.S. Pat. No. 2,105,799 and the corresponding British patent 476,349, has become known to a wide group of experts, particularly by the publication in the supplement by K. Michel to the "Handbuch der wissenschaftlichen und angewandten Photographie" (Handbook of scientific and applied photography) published by Springer, Vienna, 1943, page 28, FIG. 22. The description given therein of the variation of the aberration in the central part of the image (FIG. 22a) shows the extremely large zonal defects of spherical aberration (solid line curve) and deviation from the sine condition (dashed line curve) which clearly confirm the above statements. Such defects may have been entirely acceptable for the state of the art at that time, but are no longer acceptable at the present time, when a higher quality of performance is demanded. FIG. 22b of the above cited publication shows the astigmatic image-point deviations for the position of the sagittal image points (solid line curve) as well as for the tangential image points (dashed line curve).

From this information given in the publication just cited, it can be seen that even with an inclination of the main beam of 20° the astigmatism reaches the critical limit of 1.0% of the equivalent focal length, increasing in the case of an inclination of the beam of 25.5° to 2.09%, and thus exceeding the permissible amount which modern photographic technique specifies for the existence of an image combining which is considered to be good according to today's standards.

With a knowledge of the present disclosure of the new principle of construction and its optical importance, a comparative analysis readily shows the man skilled in the art that not only are the detailed statements in connection with the present patent application fully confirmed, but that, in addition, this older form of construction of five-lens expansions of the Tessar type must necessarily have such an aberration-affected beam combination of finitely opened and finitely inclined beam bundles that the comparative numerical values in the case of this older objective lie far outside the characteristic framework and the combination of features in accordance with the present invention. The present invention enables this specific type of five-lens partially cemented objective to be designed by using the rules or features herein stated, in a manner which is very simple for such an important increase in picture performance.

In the following data tables, 14 specific examples of lens systems according to the present invention are given. In all of these examples, all linear measurements such as radii, thicknesses, and spacings are stated as proportions of the equivalent focal length (F) of the entire objective or lens system, which is considered as unity. That is, F = 1.0000. The individual lens elements are indicated, both in the example tables and in the schematic drawing, by the letter L with a subscript corresponding to the number of the individual lens element as numbered consecutively from front to rear, that is, from 1 to 5. The lens components are indicated by capital letters A through D, the first three lens elements being regarded as individual components, while lens elements 4 and 5, being cemented to each other, are regarded as a single component D. For convenience of illustration, the elements $L_4$ and $L_5$ are shown in the diagram as being slightly separated from each other, but actually they are cemented to each other as shown by the designation of zero spacing at this point, in all of the tables of specific examples.

The radii of curvature of the front surface and the rear surface of each element are indicated by R and R', respectively, with a subscript indicating the number of that particular element. Positive values of R or R' indicates surfaces convex toward the front of the lens, and negative values indicate surfaces concave toward the front, in accordance with customary usage. The end of the lens toward the distant object or longer conjugate is referred to for convenience as the front, and the end toward the image (that is, toward the camera, if the lens is used on a photographic camera) is referred to for convenience as the rear of the lens. The light is assumed, in accordance with conventional lens patent practice, to enter from the front, and to pass through the lens from left to right as indicated by the arrow in the lens diagram.

Axial thicknesses of individual elements are indicated in the tables by the letter $d$ with a subscript referring to the identifying number of the particular lens element. Spacings between the elements are indicated by the letter $s$ with a subscript corresponding to the identifying number of the lens element in front of the space and lens element behind the space. For example, $s_{12}$ indicates the space between element 1 and element 2, and $s_{23}$ indicates the space between element 2 and element 3, and so on. Zero spacing indicates elements cemented to each other. All spacings greater than zero refer to air spacings. In all examples, the space $s_{34}$ between element 3 and element 4 is considered the central space (CS) in which the stop or diaphragm is to be located.

The index of refraction of the glass used for each element is shown either by the symbol $n$ with a subscript referring to the individual lens element, or by data in a column headed $n_d$, the latter being used for the sake of compactness when the data also includes the Abbe number or dispersive index, in a column headed $v_d$. When an objective is designed for use in only a very narrow spectral range, the refractive index refers specifically to this narrow range. If the lens is to be used over a wide spectral range, as for example in taking color photographs, then instead of monochromatic image-error correction, an achromatism should be brought about over the wider spectral range required. For this purpose, in known manner, the glasses are to be chosen so that the color dispersion of the glasses used, defined by their corresponding $v$ value or Abbe number, serves to eliminate the chromatic deviations or errors due to the wavelengths which enter into consideration.

During the course of making this invention it was found, by way of confirmation, that upon the development of the so-called initial forms or preforms of the objective, and then in the course of the subsequent technical rough shaping (rough form) in known manner with the first correction normally customary in the Seidel range (third order) the use of one of the standard indices of refraction can take place in a purely routine manner. A convenient index to use for this purpose is the index of refraction for the yellow d-line of the helium spectrum, with a wavelength of 5876 Angstrom units. Data for this wavelength is customarily shown in many commercial catalogues of manufacturers of optical glasses.

In addition to the values of the linear dimensions and the characteristics of the glass, the example tables also indicate, at the top of each table, the intended relative aperture, the total field angle designated as numeral $2w_o$ provided for, as well as the resultant back focus $s_{oo}'$.

The first four examples relate to preforms in accordance with the invention which are provided in the region of the third order with monochromatic precorrection, the indices of refraction used in these examples being based on the above mentioned wavelength of 5876 Angstrom units.

The fact that the invention provides a truly novel principle of construction is made clear not only by the scope of use both with respect to relative aperture and with respect to angular extent of the image field, but also by the fact the front element in its three-lens overall combination can be developed either with a negative paraxial power of its own (examples 6, 8, 9, and 10) or with a positive power (examples 1, 2, 4, 5, 7, 11, 12, 13, and 14) or with a completely free power or refraction and therefore with an intrinsic power of 0 (example 3) provided that the new rules of construction in accordance with the invention are satisfied.

Example 1

$F = 1.00000 \quad f/2.9 \quad 2w_o = 50°$ $\quad\quad\quad ' = + 0.6341 F$

| | | | | |
|---|---|---|---|---|
| A | $L_1$ | $R_1 = + 0.39000$ | $d_1 = 0.09000$ | $n_1 = 1.6810$ |
| | | $R_1' = + 0.91453$ | | |
| | | | $s_{12} = 0.00140$ | |
| B | $L_2$ | $R_2 = + 0.35150$ | $d_2 = 0.07000$ | $n_2 = 1.7200$ Vgl. |
| | | $R_2' = + 0.70339$ | | |
| | | | $s_{23} = 0.02844$ | |
| C | $L_3$ | $R_3 = + 2.35386$ | $d_3 = 0.02055$ | $n_3 = 1.7850$ |
| | | $R_3' = + 0.25217$ | | |
| | | | $CS = s_{34} = 0.10163$ | |
| D | $L_4$ | $R_4 = + 2.50017$ | $d_4 = 0.028999$ | $n_4 = 1.6380$ |
| | | $R_4' = + 0.32000$ | | |
| | | | $s_{45} = 0$ | Hgl. |
| | $L_5$ | $R_5 = + 0.32000$ | $d_5 = 0.115965$ | $n_5 = 1.7440$ |
| | | $R_5' = - 1.13500$ | | |

Example 2

| | | F = 1.00000 f/2.7 $2\omega_o = 53°$ $s\infty' = +0.6341$ F | | |
|---|---|---|---|---|
| A | $L_1$ | $R_1 = +0.3910$ | $d_1 = 0.08620$ | $n_1 = 1.717$ |
| | | $R_1' = +0.8200$ | $s_{12} = 0.00250$ | |
| B | $L_2$ | $R_2 = +0.3450$ | $d_2 = 0.07060$ | $n_2 = 1.717$ Vgl. |
| | | $R_2' = +0.7450$ | $s_{23} = 0.02750$ | |
| C | $L_3$ | $R_3 = +2.5000$ | $d_3 = 0.02050$ | $n_3 = 1.785$ |
| | | $R_3' = +0.2485$ | CS = $s_{34} = 0.100020$ | |
| D | $L_4$ | $R_4 = +2.5000$ | $d_4 = 0.02900$ | $n_4 = 1.638$ |
| | | $R_4' = +0.3200$ | $s_{45} = 0$ | Hgl. |
| | $L_5$ | $R_5 = +0.3200$ | $d_5 = 0.116025$ | $n_5 = 1.744$ |
| | | $R_5' = -1.1350$ | | |

Example 3

| | | F = 1.00000 f/2.3 $2\omega_o = 43°$ $s\infty' = +0.6383$ F | | |
|---|---|---|---|---|
| A | $L_1$ | $R_1 = +0.4440$ | $d_1 = 0.08700$ | $n_1 = 1.6780$ |
| | | $R_1' = +1.9000$ | $s_{12} = 0.00180$ | |
| B | $L_2$ | $R_2 = +0.4530$ | $d_2 = 0.06850$ | $n_2 = 1.7440$ Vgl. |
| | | $R_2' = +0.5700$ | $s_{23} = 0.05250$ | |
| C | $L_3$ | $R_3 = -7.2440$ | $d_3 = 0.06677$ | $n_3 = 1.7280$ |
| | | $R_3' = +0.3076$ | CS = $s_{34} = 0.12000$ | |
| D | $L_4$ | $R_4 = +1.7160$ | $d_4 = 0.02440$ | $n_4 = 1.5810$ |
| | | $R_4' = +0.3900$ | $s_{45} = 0$ | Hgl. |
| | $L_5$ | $R_5 = +0.3900$ | $d_5 = 0.08090$ | $n_5 = 1.7440$ |
| | | $R_5' = -0.9530$ | | |

Example 4

| | | F = 1.00000 f/1.6 $2\omega_o = 33°$ $s\infty' = +0.3890$ F | | |
|---|---|---|---|---|
| A | $L_1$ | $R_1 = +0.576$ | $d_1 = 0.1915$ | $n_1 = 1.734$ |
| | | $R_1' = +3.580$ | $s_{12} = 0.0027$ | |
| B | $L_2$ | $R_2 = +0.454$ | $d_2 = 0.1207$ | $n_2 = 1.788$ Vgl. |
| | | $R_2' = +0.684$ | $s_{23} = 0.0600$ | |
| C | $L_3$ | $R_3 = +8.180$ | $d_3 = 0.0375$ | $n_3 = 1.847$ |
| | | $R_3' = +0.295$ | CS = $s_{34} = 0.1702$ | |
| D | $L_4$ | $R_4 = +1.900$ | $d_4 = 0.0375$ | $n_4 = 1.500$ |
| | | $R_4' = +0.516$ | $s_{45} = 0$ | Hgl. |
| | $L_5$ | $R_5 = +0.516$ | $d_5 = 0.206996$ | $n_5 = 1.784$ |
| | | $R_5' = -1.033$ | | |

Example 5

| | | F = 1.00000 f/3.5 $2\omega_o = 52°$ $s\infty' = +0.6751$ F | | |
|---|---|---|---|---|
| | | | | $n_d / \nu_d$ |
| A | $L_1$ | $R_1 = +0.34480$ | $d_1 = 0.070785$ | 1.67790/55.20 |
| | | $R_1' = +0.68793$ | $s_{12} = 0.002441$ | |
| B | $L_2$ | $R_2 = +0.31175$ | $d_2 = 0.062974$ | 1.67790/55.20 Vgl. |
| | | $R_2' = +0.65413$ | $s_{23} = 0.028070$ | |
| C | $L_3$ | $R_3 = +2.38868$ | $d_3 = 0.014645$ | 1.72151/29.25 |
| | | $R_3' = +0.22715$ | | |

Example 5-continued $F = 1.00000 \quad f/3.5 \quad 2\omega_o = 52° \quad s\infty' = + 0.6751\ F$

| | | | | $n_d / \nu_d$ | |
|---|---|---|---|---|---|
| | | | $CS = s_{34} = 0.096414$ | | |
| D | L$_4$ | R$_4$ = + 1.69108 | d$_4$ = 0.017574 | 1.68900/49.46 | |
| | | R$_4'$ = + 0.24946 | $s_{45} = 0$ | | Hgl. |
| | L$_5$ | R$_5$ = + 0.24946 | d$_5$ = 0.059801 | 1.74400/44.77 | |
| | | R$_5'$ = − 1.27733 | | | |

Example 6

$F = 1.00000 \quad f/2.9 \quad 2\omega_o = 51° \quad s\infty' = + 0.6988\ F$

| | | | | $n_d / \nu_d$ | |
|---|---|---|---|---|---|
| A | L$_1$ | R$_1$ = + 0.35015 | d$_1$ = 0.069804 | 1.71700/47.99 | |
| | | R$_1'$ = + 0.90521 | $s_{12} = 0.001225$ | | |
| B | L$_2$ | R$_2$ = + 0.42220 | d$_2$ = 0.042862 | 1.71700/47.99 | Vgl. |
| | | R$_2'$ = + 0.59635 | $s_{23} = 0.027187$ | | |
| C | L$_3$ | R$_3$ = + 57.93723 | d$_3$ = 0.051434 | 1.72830/28.68 | |
| | | R$_3'$ = + 0.26829 | $CS = s_{34} = 0.062456$ | | |
| D | L$_4$ | R$_4$ = + 2.74182 | d$_4$ = 0.044699 | 1.54814/45.75 | |
| | | R$_4'$ = + 0.35520 | $s_{45} = 0$ | | Hgl. |
| | L$_5$ | R$_5$ = + 0.35520 | d$_5$ = 0.105930 | 1.74400/44.77 | |
| | | R$_5'$ = − 0.93837 | | | |

Example 7

$F = 1.00000 \quad f/2.9 \quad 2\omega_o' = 53.8° \quad s\infty' = + 0.6341\ F$

| | | | | $n_d / \nu_d$ | |
|---|---|---|---|---|---|
| A | L$_1$ | R$_1$ = + 0.39063 | d$_1$ = 0.086215 | 1.71700/47.99 | |
| | | R$_1'$ = + 0.81969 | $s_{12} = 0.002395$ | | |
| B | L$_2$ | R$_2$ = + 0.34563 | d$_2$ = 0.070649 | 1.71700/47.99 | Vgl. |
| | | R$_2'$ = + 0.74651 | $s_{23} = 0.027541$ | | |
| C | L$_3$ | R$_3$ = + 2.31031 | d$_3$ = 0.020356 | 1.78472/25.76 | |
| | | R$_3'$ = + 0.24823 | $CS = s_{34} = 0.100585$ | | |
| D | L$_4$ | R$_4$ = + 2.76560 | d$_4$ = 0.020356 | 1.63854/55.38 | |
| | | R$_4'$ = + 0.31936 | $s_{45} = 0$ | | Hgl. |
| | L$_5$ | R$_5$ = + 0.31936 | d$_5$ = 0.116151 | 1.74400/44.77 | |
| | | R$_5'$ = − 1.13309 | | | |

Example 8

$F = 1.00000 \quad f/2.4 \quad 2\omega_o = 54° \quad s\infty' = + 0.6649\ F$

| | | | | $n_d / \nu_d$ | |
|---|---|---|---|---|---|
| A | L$_1$ | R$_1$ = + 0.37875 | d$_1$ = 0.094919 | 1.67790/55.20 | |
| | | R$_1'$ = + 0.72387 | $s_{12} = 0.002373$ | | |
| B | L$_2$ | R$_2$ = + 0.42194 | d$_2$ = 0.070477 | 1.80279/46.76 | Vgl. |
| | | R$_2'$ = + 0.64054 | $s_{23} = 0.040340$ | | |
| C | L$_3$ | R$_3$ = − 9.72419 | d$_3$ = 0.024916 | 1.76180/26.95 | |
| | | R$_3'$ = + 0.29449 | | | |

Example 8-continued

| | | $F = 1.00000$ $f/2.4$ $2\omega_o = 54°$ $s\infty' = + 0.6649 F$ | | |
|---|---|---|---|---|
| | | $CS = s_{34} = 0.053392$ | | |
| | $R_4 = + 1.62057$ | | | |
| D ⟨ L_4 | $R_4' = + 0.40696$ | $d_4 = 0.018984$ | 1.46450/65.70 | |
| | $R_5 = + 0.40696$ | $s_{45} = 0$ | | Hgl. |
| L_5 | $R_5' = - 0.97225$ | $d_5 = 0.129327$ | 1.74400/44.77 | |

Example 9

$F = 1.00000$ $f/2.5$ $2\omega_o = 41°$ $s\infty' = + 0.6473 F$

| | | | | $n_d / \nu_d$ | |
|---|---|---|---|---|---|
| A | L_1 | $R_1 = + 0.44587$ | $d_1 = 0.113794$ | 1.67790/55.20 | |
| | | $R_1' = + 2.79332$ | $s_{12} = 0.001737$ | | |
| B | L_2 | $R_2 = + 0.50391$ | $d_2 = 0.061675$ | 1.74400/44.77 | Vgl. |
| | | $R_2' = + 0.68174$ | $s_{23} = 0.069493$ | | |
| C | L_3 | $R_3 = - 1.66399$ | $d_3 = 0.035615$ | 1.76180/26.95 | |
| | | $R_3' = + 0.32724$ | $CS = s_{34} = 0.109451$ | | |
| | L_4 | $R_4 = + 4.12005$ | $d_4 = 0.030403$ | 1.52341/51.47 | |
| D | | $R_4' = + 0.50391$ | $s_{45} = 0$ | | Hgl. |
| | L_5 | $R_5 = + 0.50391$ | $d_5 = 0.074705$ | 1.74400/44.77 | |
| | | $R_5' = - 0.68174$ | | | |

Example 10

$F = 1.00000$ $f/2.5$ $2\omega_o = 41°$ $s\infty' = + 0.6381 F$

| | | | | $n_d / \nu_d$ | |
|---|---|---|---|---|---|
| A | L_1 | $R_1 = + 0.44382$ | $d_1 = 0.087078$ | 1.67790/55.20 | |
| | | $R_1' = + 1.89875$ | $s_{12} = 0.001742$ | | |
| B | L_2 | $R_2 = + 0.45343$ | $d_2 = 0.068791$ | 1.74400/44.77 | Vgl. |
| | | $R_2' = + 0.57095$ | $s_{23} = 0.052247$ | | |
| C | L_3 | $R_3 = - 7.13672$ | $d_3 = 0.067921$ | 1.72825/28.41 | |
| | | $R_3' = + 0.30524$ | $CS = s_{34} = 0.118774$ | | |
| | L_4 | $R_4 = + 1.64413$ | $d_4 = 0.024382$ | 1.58144/40.86 | |
| D | | $R_4' = + 0.38986$ | $s_{45} = 0$ | | Hgl. |
| | L_5 | $R_5 = + 0.38986$ | $d_5 = 0.081853$ | 1.74400/44.77 | |
| | | $R_5' = - 0.95159$ | | | |

Example 11

$F = 1.00000$ $f/1.4$ $2\omega_o = 32.5°$ $s\infty' = + 0.3890 F$

| | | | | $n_d / \nu_d$ | |
|---|---|---|---|---|---|
| A | L_1 | $R_1 = + 0.57562$ | $d_1 = 0.191482$ | 1.73350/51.65 | |
| | | $R_1' = + 3.58024$ | $s_{12} = 0.002659$ | | |
| B | L_2 | $R_2 = + 0.45392$ | $d_2 = 0.120740$ | 1.78831/47.37 | Vgl. |
| | | $R_2' = + 0.68418$ | $s_{23} = 0.060104$ | | |
| C | L_3 | $R_3 = + 8.30927$ | $d_3 = 0.037233$ | 1.84666/23.82 | |
| | | $R_3' = + 0.29478$ | $CS = s_{34} = 0.170207$ | | |
| | L_4 | $R_4 = + 1.90083$ | $d_4 = 0.037233$ | 1.50013/61.44 | |
| D | | $R_4' = + 0.51680$ | $s_{45} = 0$ | | Hgl |
| | L_5 | $R_5 = + 0.51680$ | $d_5 = 0.207439$ | 1.78427/41.30 | |
| | | $R_5' = - 1.03119$ | | | |

Example 12

| | | $F = 1.00000$ | $f/1.4$ | $2\omega_o = 33°$ | $s\infty' = +0.3640\ F$ | |
|---|---|---|---|---|---|---|
| | | | | | $n_d / \nu_d$ | |
| A | $L_1$ | $R_1 = +0.59523$ | $d_1 = 0.206663$ | | 1.71300/53.85 | |
| | | $R_1' = +5.78329$ | $s_{12} = 0.002691$ | | | |
| B | $L_2$ | $R_2 = +0.45297$ | $d_2 = 0.142081$ | | 1.78831/47.37 | Vgl. |
| | | $R_2' = +0.67747$ | $s_{23} = 0.043055$ | | | |
| C | $L_3$ | $R_3 = +6.87377$ | $d_3 = 0.037673$ | | 1.84666/23.82 | |
| | | $R_3' = +0.29826$ | $CS = s_{34} = 0.153383$ | | | |
| D | $L_4$ | $R_4 = +1.85545$ | $d_4 = 0.061891$ | | 1.50013/61.44 | |
| | | $R_4' = +0.55003$ | $s_{45} = 0$ | | | Hgl. |
| | $L_5$ | $R_5 = +0.55003$ | $d_5 = 0.207202$ | | 1.78427/41.30 | |
| | | $R_5' = -1.12126$ | | | | |

Example 13

| | | $F = 1.00000$ | $f/1.2$ | $2\omega_o = 33°$ | $s\infty' = +0.2895\ F$ | |
|---|---|---|---|---|---|---|
| | | | | | $n_d / \nu_d$ | |
| A | $L_1$ | $R_1 = +0.85142$ | $d_1 = 0.221864$ | | 1.78831/47.37 | |
| | | $R_1' = +5.64969$ | $s_{12} = 0.005411$ | | | |
| B | $L_2$ | $R_2 = +0.51816$ | $d_2 = 0.189396$ | | 1.78831/47.37 | Vgl. |
| | | $R_2' = +1.18551$ | $s_{23} = 0.021645$ | | | |
| C | $L_3$ | $R_3 = +2.56026$ | $d_3 = 0.140694$ | | 1.91761/21.51 | |
| | | $R_3' = +0.29990$ | $CS = s_{34} = 0.156928$ | | | |
| D | $L_4$ | $R_4 = +2.13866$ | $d_4 = 0.035174$ | | 1.52341/51.47 | |
| | | $R_4' = +0.44236$ | $s_{45} = 0$ | | | Hgl. |
| | $L_5$ | $R_5 = +0.44236$ | $d_5 = 0.216453$ | | 1.80801/40.75 | |
| | | $R_5' = -1.31143$ | | | | |

Example 14

| | | $F = 1.00000$ | $f/1.3$ | $2\omega_o = 18°$ | $s\infty' = +0.3420\ F$ | |
|---|---|---|---|---|---|---|
| | | | | | $n_d / \nu_d$ | |
| A | $L_1$ | $R_1 = +0.65893$ | $d_1 = 0.230703$ | | 1.71300/53.85 | |
| | | $R_1' = -11.97527$ | $s_{12} = 0.004837$ | | | |
| B | $L_2$ | $R_2 = +0.51229$ | $d_2 = 0.125750$ | | 1.78831/47.37 | Vgl. |
| | | $R_2' = +0.95812$ | $s_{23} = 0.048365$ | | | |
| C | $L_3$ | $R_3 = -4.24885$ | $d_3 = 0.106404$ | | 1.84666/23.82 | |
| | | $R_3' = +0.30077$ | $CS = s_{34} = 0.154769$ | | | |
| D | $L_4$ | $R_4 = +54.26597$ | $d_4 = 0.096731$ | | 1.51009/63.52 | |
| | | $R_4' = +0.55848$ | $s_{45} = 0$ | | | Hgl. |
| | $L_5$ | $R_5 = +0.55848$ | $d_5 = 0.162024$ | | 1.78831/47.37 | |
| | | $R_5' = -0.67818$ | | | | |

The specific examples given above show the wide scope for practical use of the new principles of construction herein disclosed, with respect to a range of relative apertures from $f/3.5$ (example 5) to $f/1.2$ (example 13) with various useful angular fields which, depending on the purpose of use, may cover an angle from about 18° (example 14) to about 54° (example 8).

The great importance of the new features or rules of construction herein disclosed, in obtaining improved imageforming performance in five-lens objectives of the expanded Tessar type herein discussed, is shown particularly impressively by a comparison of the data of the preforms indicated with the construction data for the precisely corrected objectives. Reference may be had in this connection to such a data comparison between example 2 on the one hand and example 7 on the other hand. Furthermore, from a comparison of the data of example 3 with the data of example 10, and from a comparison of the data of example 4 with the data of example 11, it can be clearly noted what slight variations within the scope of the new principles of design need only be still effected to arrive from a simplified form of construction to an extremely precisely corrected embodiment, by following the inventive concepts in accordance with the design rules or features here disclosed.

It may also be pointed out that examples 12 and 13 are particularly useful for photographing signals by means of photoelectronic picture tubes. For this purpose, both examples 12 and 13 are corrected with due consideration of the action of a selected filter plate (SF) as well as an emulsion support plate (TP), the latter having its rear surface coinciding with the image then directly adjacent the photoelectronic recording layer. In example 12, the filter plate (SF) is developed with flat parallel surfaces arranged at a distance of 0.107637 F axially from the last lens vertex $R'_5$. This plate has an axial thickness $d_{SF}$ of 0.080728 F. The emulsion plate (TP) has a thickness $d_{TP}$ of 0.064582 F, following at a distance of 0.15905 F behind the filter plate. Both plates are made of the same type of glass, having an index of refraction of 1.51680, and an Abbe dispersion index of 64.12.

In example 13, both plates are of the same type of glass used in example 12, but the spacing and thicknesses are somewhat different. The distance of the first plate behind the vertex of the last lens surface is 0.108226 F, the thickness of this plate is 0.081170 F, the distance from the rear surface of this plate to the front surface of the emulsion support plate is 0.083876 F, and the thickness of the emulsion support plate is 0.064936 F.

The following tables I and II give data useful in comparing various features of the lenses according to examples 1–14 with each other and in comparing them with typical constructions of the prior art. Table I gives numerical values, for comparison purposes, of the indices of refraction of the glass of the first two lens elements, indicated in the respective columns headed $n_1$ and $n_2$, and the values of the coefficients calculated therefrom, explained near the beginning of this specification and identified there as $x'$ and $x''$, in the columns with those respective headings. These respective numerical values are given for all of the 14 specific examples embodying the present invention, at the bottom portion of Table I, and are also given, in the top portion of Table I, for certain selected typical lenses of the prior art. The first line, under the prior art section, gives the calculated values for British patent 476,349. The second and third lines give the calculated values for examples 1 and 2, respectively, of German gebrauchsmuster 1,882,723, while the fourth and last line of the prior art section of this table, gives the calculated values for the lens disclosed in German patent 1,190,216.

In Table II, the numerical values are given, for the same prior art patents and for the 14 specific examples of the present invention, with respect to the three special features of the present invention, in the respective columns headed $(a)$ and $(b_1)$ and $(b_2)$, corresponding to the designation of these special features of the present invention in the above discussion.

In stating limits or ranges for the various features of the invention, in the claims or elsewhere, it should be borne in mind that ranges are subject to a tolerance of plus or minus 5%, as customary in the optical field.

Table 1

| Objective | The generic concept | | | | | |
|---|---|---|---|---|---|---|
| | $n_1$ | $x'$ | $x''$ | $n_2$ | $x'$ | $x''$ |
| The prior art | | | | | | |
| Brit. Pat. 476.349 | 1.5890 | 2.69779 | 7.27809 | 1.63750 | 2.56863 | 6.59785 |
| Dt.GM 1.882.723/1 | 1.62041 | 2.61184 | 6.82169 | 1.62041 | 2.61184 | 6.82169 |
| 1.882.723/2 | 1.62041 | 2.61184 | 6.82169 | 1.62041 | 2.61184 | 6.82169 |
| Dt.Pat. 1.190.216 | 1.6910 | 2.44718 | 5.98868 | 1.6910 | 2.44718 | 5.98868 |
| The invention | | | | | | |
| Ex. 1 | 1.6810 | 2.46843 | 6.09314 | 1.7200 | 2.38889 | 5.70679 |
| 2 | 1.7170 | 2.39470 | 5.73459 | 1.7170 | 2.39470 | 5.73459 |
| 3 | 1.6780 | 2.47493 | 6.12526 | 1.7440 | 2.34409 | 5.49474 |
| 4 | 1.7340 | 2.36240 | 5.58092 | 1.7880 | 2.26904 | 5.14852 |
| 5 | 1.6779 | 2.47514 | 6.12634 | 1.6779 | 2.47514 | 6.12634 |
| 6 | 1.7170 | 2.39470 | 5.73459 | 1.7170 | 2.39470 | 5.73459 |
| 7 | 1.7170 | 2.39470 | 5.73459 | 1.7170 | 2.39470 | 5.73459 |
| 8 | 1.6779 | 2.47514 | 6.12634 | 1.80279 | 2.24566 | 5.04297 |
| 9 | 1.6779 | 2.47514 | 6.12634 | 1.7440 | 2.34409 | 5.49474 |
| 10 | 1.6779 | 2.47514 | 6.12634 | 1.7440 | 2.34409 | 5.49474 |
| 11 | 1.7335 | 2.36333 | 5.58531 | 1.78830 | 2.26855 | 5.14633 |
| 12 | 1.7130 | 2.40252 | 5.77212 | 1.78831 | 2.26854 | 5.14626 |
| 13 | 1.78831 | 2.26854 | 5.14626 | 1.78831 | 2.26854 | 5.14626 |
| 14 | 1.7130 | 2.40252 | 5.77212 | 1.78831 | 2.26854 | 5.14626 |

Table II

| Objective | Values of features | | |
|---|---|---|---|
| | (a) $\overline{\sigma}_{2,1}$ | $(b_1)$ B - A | $(b_2)$ $\overline{\psi}_{BA}$ |
| The prior art | | | |
| Brit.Pat. 476.349 | +0.1129 | −0.62741 Φ | −0.54540 |
| Dt.GM 1.892.723/1 | −0.3525 | +0.18496 Φ | +0.22512 |
| 1.882.723/2 | −0.3535 | +0.18999 Φ | +0.23250 |

Table II-continued

| Objective | Values of features | | |
|---|---|---|---|
| | (a) $\bar{\sigma}_{z,1}$ | (b$_1$) B - A | (b$_2$) $\bar{\psi}_{BA}$ |
| Dt.Pat. 1.190.216 | −0.2930 | +0.25193 Φ | +0.23202 |
| The invention | | | |
| Ex. 1 | −0.0519 | 0 | 0 |
| Ex. 2 | −0.0625 | +0.09113 Φ | +0.07540 |
| Ex. 3 | +0.0100 | −0.50407 Φ | −0.56594 |
| Ex. 4 | −0.0844 | −0.29024 Φ | −0.30776 |
| Ex. 5 | −0.0503 | +0.09027 Φ | +0.07128 |
| Ex. 6 | +0.0932 | −0.44247 Φ | −0.43374 |
| Ex. 7 | −0.0611 | +0.08924 Φ | +0.07385 |
| Ex. 8 | +0.0539 | −0.14841 Φ | −0.17083 |
| Ex. 9 | +0.0611 | −0.54067 Φ | −0.55039 |
| Ex. 10 | +0.0107 | −0.50389 Φ | −0.56540 |
| Ex. 11 | −0.1182 | −0.29008 Φ | −0.30737 |
| Ex. 12 | −0.1357 | −0.30518 Φ | −0.32145 |
| Ex. 13 | −0.2433 | +0.03918 Φ | +0.04265 |
| Ex. 14 | −0.1252 | −0.26603 Φ | −0.24937 |

What is claimed is:

1. An objective of five lens elements, divided into a front member of three elements all air spaced from each other, and a rear member of two lens elements cemented to each other to form a single component, the two elements of said rear member being of opposite sign of power and the neighboring surfaces thereof forming a collecting cement surface;

the front lens element of said front member being a collecting lens having unequal front and rear surfaces;

the second lens element being a positive meniscus concave toward the rear and slightly air spaced rearwardly from said front element;

the third lens element being separated from the second element by a dispersing air space, said third element being a negative lens having unequal front and rear surfaces and having its rear surface concave toward the rear and having its rear surface more strongly curved than its front surface;

said front element and said second element both being formed of glass having an index of refraction for the yellow d-line of the helium spectrum which is within the range limits of 1.6454 and 1.80279;

said objective being characterized by the presence of all of the following features:

a. the respective radii of the front surfaces of said front element and said second element are so related to each other that the reciprocal of the Gardner curvature index for those two surfaces is within the range limits of + 0.094 and − 0.244;

b$_1$. said front element and said second element are so dimensioned relative to each other that the difference of the Petzval curvature portion of the second element minus the Petzval curvature portion of the front element is within the range limits of + 0.092 Φ and − 0.541 Φ; and b$_2$. the quotient of said difference of the Petzval curvature portion of the second element minus that of the front element divided by the sum of said Petzval curvature portions of the front and second elements is within the range limits of + 0.076 and − 0.566;

said reciprocal of said Gardner curvature index being determined as the quotient of the radius of the front surface of said second element minus the radius of the front surface of said front element, divided by the sum of the two radii; and said Petzval curvature portion of each of said front and second elements being determined as the quotient of the power of the respective lens element divided by the index of refraction of the glass of which the respective element is made.

2. An objective as defined in claim 1, wherein the characteristics of the lens elements and their spatial relationship to each other are substantially as indicated below:

| | | F = 1.00000  f/2.9  2ωo = 50°  s∞' = + 0.6341 F | | |
|---|---|---|---|---|
| A | L$_1$ | R$_1$ = + 0.39000 | d$_1$ = 0.09000 | n$_1$ = 1.6810 |
| | | R$_1$' = + 0.91453 | s$_{12}$ = 0.00140 | |
| B | L$_2$ | R$_2$ = + 0.35150 | d$_2$ = 0.07000 | n$_2$ = 1.7200  Vgl. |
| | | R$_2$' = + 0.70339 | s$_{23}$ = 0.02844 | |
| C | L$_3$ | R$_3$ = + 2.35386 | d$_3$ = 0.02055 | n$_3$ = 1.7850 |
| | | R$_3$' = + 0.25217 | CS = s$_{34}$ = 0.10163 | |
| D | L$_4$ | R$_4$ = + 2.50017 | d$_4$ = 0.028999 | n$_4$ = 1.6380 |
| | | R$_4$' = + 0.32000 | s$_{45}$ = 0 | Hgl. |
| | L$_5$ | R$_5$ = + 0.32000 | d$_5$ = 0.115965 | n$_5$ = 1.7440 |
| | | R$_5$' = − 1.13500 | | | all linear dimensions being expressed in proportion to the equivalent focal length of the entire lens system considered as unity, the symbols having the meanings explained in the foregoing specification.

3. An objective as defined in claim 1, wherein the characteristics of the lens elements and their spatial relationship to each other are substantially as indicated below:

| | | $F = 1.00000$ | f/2.7 | $2\omega o = 53°$ | $s\infty' = +0.6341\ F$ | |
|---|---|---|---|---|---|---|
| A | $L_1$ | $R_1 = +0.3910$ | $d_1 = 0.08620$ | | $n_1 = 1.717$ | |
| | | $R_1' = +0.8200$ | | | | |
| | | | $s_{12} = 0.00250$ | | | |
| B | $L_2$ | $R_2 = +0.3450$ | $d_2 = 0.07060$ | | $n_2 = 1.717$ | Vgl. |
| | | $R_2' = +0.7450$ | | | | |
| | | | $s_{23} = 0.02750$ | | | |
| C | $L_3$ | $R_3 = +2.5000$ | $d_3 = 0.02050$ | | $n_3 = 1.785$ | |
| | | $R_3' = +0.2485$ | | | | |
| | | | $CS = s_{34} = 0.100020$ | | | |
| D | $L_4$ | $R_4 = +2.5000$ | $d_4 = 0.02900$ | | $n_4 = 1.638$ | |
| | | $R_4' = +0.3200$ | | | | Hgl. |
| | | | $s_{45} = 0$ | | | |
| | $L_5$ | $R_5 = +0.3200$ | $d_5 = 0.116025$ | | $n_5 = 1.744$ | |
| | | $R_5' = -1.1350$ | | | | | all linear dimensions being expressed in proportion to the equivalent focal length of the entire lens system considered as unity, the symbols having the meanings explained in the forgoing specification.

5. An objective as defined in claim 1, wherein the characteristics of the lens elements and their spatial relationship to each other are substantially as indicated below:

| | | $F = 1.00000$ | f/1.6 | $2\omega o = 33°$ | $s_\infty' = 0.3890\ F$ | |
|---|---|---|---|---|---|---|
| A | $L_1$ | $R_1 = +0.576$ | $d_1 = 0.1915$ | | $n_1 = 1.734$ | |
| | | $R_1' = +3.580$ | | | | |
| | | | $s_{12} = 0.0027$ | | | |
| B | $L_2$ | $R_2 = +0.454$ | $d_2 = 0.1207$ | | $n_2 = 1.788$ | Vgl. |
| | | $R_2' = +0.684$ | | | | |
| | | | $s_{23} = 0.0600$ | | | |
| C | $L_3$ | $R_3 = +8.180$ | $d_3 = 0.0375$ | | $n_3 = 1.847$ | |
| | | $R_3' = +0.295$ | | | | |
| | | | $CS = s_{34} = 0.1702$ | | | |
| D | $L_4$ | $R_4 = +1.900$ | $d_4 = 0.0375$ | | $n_4 = 1.500$ | |
| | | $R_4' = +0.516$ | | | | Hgl. |
| | | | $s_{45} = 0$ | | | |
| | $L_5$ | $R_5 = +0.516$ | $d_5 = 0.206996$ | | $n_5 = 1.784$ | |
| | | $R_5' = -1.033$ | | | | |

4. An objective as defined in claim 1, wherein the characteristics of the lens elements and their spatial relationship to each other are substantially as indicated below:

all linear dimensions being expressed in proportion to the equivalent focal length of the entire lens system considered as unity, the symbols having the meanings explained in the foregoing specification.

| | | $F = 1.00000$ | f/2.3 | $2\omega o = 43°$ | $a_\infty' = +0.6383\ F$ | |
|---|---|---|---|---|---|---|
| A | $L_1$ | $R_1 = +0.4440$ | $d_1 = 0.08700$ | | $n_1 = 1.6780$ | |
| | | $R_1' = +1.9000$ | | | | |
| | | | $s_{12} = 0.00180$ | | | |
| B | $L_2$ | $R_2 = +0.4530$ | $d_2 = 0.06850$ | | $n_2 = 1.7440$ | Vgl. |
| | | $R_2' = +0.5700$ | | | | |
| | | | $s_{23} = 0.05250$ | | | |
| C | $L_3$ | $R_3 = -7.2440$ | $d_3 = 0.06677$ | | $n_3 = 1.7280$ | |
| | | $R_3' = +0.3076$ | | | | |
| | | | $CS = s_{34} = 0.12000$ | | | |
| D | $L_4$ | $R_4 = +1.7160$ | $d_4 = 0.02440$ | | $n_4 = 1.5810$ | |
| | | $R_4' = +0.3900$ | | | | Hgl. |
| | | | $s_{45} = 0$ | | | |
| | $L_5$ | $R_5 = +0.3900$ | $d_5 = 0.08090$ | | $n_5 = 1.7440$ | |
| | | $R_5' = -0.9530$ | | | | | all linear dimensions being expressed in proportion to the equivalent focal length of the entire lens system considered as unity, the symbols having the meanings explained in the foregoing specification.

6. An objective as defined in claim 1, wherein the characteristics of the lens elements and their spatial relationship to each other are substantially as indicated below:

| | | F = 1.00000 | f/3.5 | 2ωo = 52° | $s_\infty' = +0.6751$ F | |
|---|---|---|---|---|---|---|
| | | | | | $n_d/v_d$ | |
| A | $L_1$ | $R_1 = +0.34480$ | $d_1 = 0.070785$ | | 1.67790/55.20 | |
| | | $R_1' = +0.68793$ | $s_{12} = 0.002441$ | | | |
| B | $L_2$ | $R_2 = +0.31175$ | $d_2 = 0.062974$ | | 1.67790/55.20 | Vgl. |
| | | $R_2' = +0.65413$ | $s_{23} = 0.028070$ | | | |
| C | $L_3$ | $R_3 = +2.38868$ | $d_3 = 0.014645$ | | 1.72151/29.25 | |
| | | $R_3' = +0.22715$ | $CS = s_{34} = 0.096414$ | | | |
| D | $L_4$ | $R_4 = +1.69108$ | $d_4 = 0.017574$ | | 1.68900/49.46 | |
| | | $R_4' = +0.24946$ | $s_{45} = 0$ | | | Hgl. |
| | $L_5$ | $R_5 = +0.24946$ | $d_5 = 0.059801$ | | 1.74400/44.77 | |
| | | $R_5' = -1.27733$ | | | | | all linear dimensions being expressed in proportion to the equivalent focal length of the entire lens system considered as unity, the symbols having the meanings explained in the foregoing specification.

7. An objective as defined in claim 1, wherein the characteristics of the lens elements and their spatial relationship to each other are substantially as indicated below:

8. An objective as defined in claim 1, wherein the characteristics of the lens elements and their spatial relationship to each other are substantially as indicated below:

| | | F = 1.00000 | f/2.9 | 2ωo = 53.5° | $s_\infty' = +0.6341$ F | |
|---|---|---|---|---|---|---|
| | | | | | $n_d/v_d$ | |
| A | $L_1$ | $R_1 = +0.39063$ | $d_1 = 0.086215$ | | 1.71700/47.99 | |
| | | $R_1' = +0.81969$ | $s_{12} = 0.002395$ | | | |
| B | $L_2$ | $R_2 = +0.34563$ | $d_2 = 0.070649$ | | 1.71700/47.99 | Vgl. |
| | | $R_2' = +0.74651$ | $s_{23} = 0.027541$ | | | |
| C | $L_3$ | $R_3 = +2.31031$ | $d_3 = 0.020356$ | | 1.78472/25.76 | |
| | | $R_3' = +0.24823$ | $CS = s_{34} = 0.100585$ | | | |
| D | $L_4$ | $R_4 = +2.76560$ | $d_4 = 0.020356$ | | 1.63854/55.38 | |
| | | $R_4' = +0.31936$ | $s_{45} = 0$ | | | Hgl. |
| | $L_5$ | $R_5 = +0.31936$ | $d_5 = 0.116151$ | | 1.74400/44.77 | |
| | | $R_5' = -1.13309$ | | | | | all linear dimensions being expressed in proportion to the equivalent focal length of the entire lens system considered as unity, the symbols having the meanings explained in the foregoing specification.

| | | F = 1.00000 | f/2.9 | 2ωo = 51° | $s_\infty' = +0.6988$ F | |
|---|---|---|---|---|---|---|
| | | | | | $n_d/v_d$ | |
| A | $L_1$ | $R_1 = +0.35015$ | $d_1 = 0.069804$ | | 1.71700/47.99 | |
| | | $R_1' = +0.90521$ | $s_{12} = 0.001225$ | | | |
| B | $L_2$ | $R_2 = +0.42220$ | $d_2 = 0.042862$ | | 1.71700/47.99 | Vgl. |
| | | $R_2' = +0.59635$ | $s_{23} = 0.027187$ | | | |
| C | $L_3$ | $R_3 = +57.93723$ | $d_3 = 0.051434$ | | 1.72830/28.68 | |
| | | $R_3' = +0.26829$ | $CS = s_{34} = 0.062456$ | | | |
| D | $L_4$ | $R_4 = +2.74182$ | $d_4 = 0.044699$ | | 1.54814/45.75 | |
| | | $R_4' = +0.35520$ | $s_{45} = 0$ | | | Hgl. |
| | $L_5$ | $R_5 = +0.35520$ | $d_5 = 0.105930$ | | 1.74400/44.77 | |
| | | $R_5' = -0.93837$ | | | | |

9. An objective as defined in claim 1, wherein the characteristics of the lens elements and their spatial relationship to each other are substantially as indicated below:

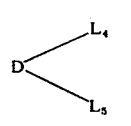

10. An objective as defined in claim 1, wherein the characteristics of the lens elements and their spatial relationship to each other are substantially as indicated below:

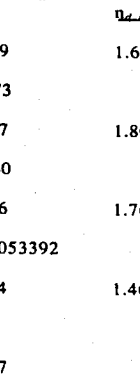

all linear dimensions being expressed in proportion to the equivalent focal length of the entire lens system considered as unity, the symbols having the meanings explained in the forgoing specification.

all linear dimensions being expressed in proportion to the equivalent focal length of the entire lens system considered as unity, the symbols having the meanings explained in the foregoing specification.

11. An objective as defined in claim 1, wherein the characteristics of the lens elements and their spatial relationship to each other are substantially as indicated below:

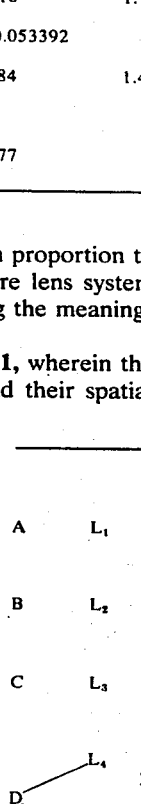

all linear dimensions being expressed in proportion to the equivalent focal length of the entire lens system considered as unity, the symbols having the meanings explained in the foregoing specification.

12. An objective as defined in claim 1, wherein the characteristics of the lens elements and their spatial relationship to each other are substantially as indicated below:

| | | F = 1.00000 | f/1.4 2ωo = 32.5° | $s_\infty' = +0.3890\ F$ |
|---|---|---|---|---|
| | | | | $n_d/\nu_d$ |
| A | $L_1$ | $R_1 = +0.57562$ | $d_1 = 0.191482$ | 1.73350/51.65 |
| | | $R_1' = +3.58024$ | | |
| | | | $s_{12} = 0.002659$ | |
| B | $L_2$ | $R_2 = +0.45392$ | $d_2 = 0.120740$ | 1.78831/47.37   Vgl. |
| | | $R_2' = +0.68418$ | | |
| | | | $s_{23} = 0.060104$ | |
| C | $L_3$ | $R_3 = +8.30927$ | $d_3 = 0.037233$ | 1.84666/23.82 |
| | | $R_3' = +0.29478$ | | |
| | | | $CS = s_{34} = 0.170207$ | |
| D | $L_4$ | $R_4 = +1.90083$ | $d_4 = 0.037233$ | 1.50013/61.44 |
| | | $R_4' = +0.51680$ | | |
| | | | $s_{45} = 0$ | Hgl. |
| | $L_5$ | $R_5 = +0.51680$ | $d_5 = 0.207439$ | 1.78427/41.30 |
| | | $R_5' = -1.03119$ | | | all linear dimensions being expressed in proportion to the equivalent focal length of the entire lens system considered as unity, the symbols having the meanings explained in the foregoing specification.

13. An objective as defined in claim 1, wherein the characteristics of the lens elements and their spatial relationship to each other are substantially as indicated below:

| | | F = 1.00000 | f/1.4 2ωo = 33° | $s_\infty' = +0.3640\ F$ |
|---|---|---|---|---|
| | | | | $n_d/\nu_d$ |
| A | $L_1$ | $R_1 = +0.59523$ | $d_1 = 0.206663$ | 1.71300/53.85 |
| | | $R_1' = +5.78329$ | | |
| | | | $s_{12} = 0.002691$ | |
| B | $L_2$ | $R_2 = +0.45297$ | $d_2 = 0.142081$ | 1.78831/47.37   Vgl. |
| | | $R_2' = +0.67747$ | | |
| | | | $s_{23} = 0.043055$ | |
| C | $L_3$ | $R_3 = +6.87377$ | $d_3 = 0.037673$ | 1.84666/23.82 |
| | | $R_3' = +0.29826$ | | |
| | | | $CS = s_{34} = 0.153383$ | |
| D | $L_4$ | $R_4 = +1.85545$ | $d_4 = 0.061891$ | 1.50013/61.44 |
| | | $R_4' = +0.55003$ | | |
| | | | $s_{45} = 0$ | Hgl. |
| | $L_5$ | $R_5 = +0.55003$ | $d_5 = 0.207202$ | 1.78427/41.30 |
| | | $R_5' = 0 - 1.12126$ | | | all linear dimensions being expressed in proportion to the equivalent focal length of the entire lens system considered as unity, the symbols having the meanings explained in the foregoing specification.

14. An objective as defined in claim 1, wherein the characteristics of the lens elements and their spatial relationship to each other are substantially as indicated below:

| | | F = 1.00000 | f/1.2 2ωo = 33° | $s_\infty' = +0.2895\ F$ |
|---|---|---|---|---|
| | | | | $n_d/\nu_d$ |
| A | $L_1$ | $R_1 = +0.85142$ | $d_1 = 0.221864$ | 1.78831/47.37 |
| | | $R_1' = +5.64969$ | | |
| | | | $s_{12} = 0.005411$ | |
| B | $L_2$ | $R_2 = +0.51816$ | $d_2 = 0.189396$ | 1.78831/47.37   Vgl. |
| | | $R_2' = +1.18551$ | | |
| | | | $s_{23} = 0.021645$ | |
| C | $L_3$ | $R_3 = +2.56026$ | $d_3 = 0.140694$ | 1.91761/21.51 |
| | | $R_340 = +0.29990$ | | |
| | | | $CS = s_{34} = 0.156928$ | |
| D | $L_4$ | $R_4 = +2.13866$ | $d_4 = 0.035174$ | 1.52341/51.47 |
| | | $R_4' = +0.44236$ | | |
| | | | $s_{45} = 0$ | Hgl. |
| | $L_5$ | $R_5 = +0.44236$ | $d_5 = 0.216453$ | 1.80801/40.75 |
| | | $R_5' = -1.31143$ | | | all linear dimensions being expressed in proportion to the equivalent focal length of the entire lens system considered as unity, the symbols having the meanings explained in the foregoing specification.

15. An objective as defined in claim 1, wherein the characteristics of the lens elements and their spatial relationship to each other are substantially as indicated below:

$F = 1.00000 \quad f/1.3 \quad 2\omega_0 = 18° \quad s_\infty' = +0.3420\ F$

| | | | | $n_d / \nu_d$ | |
|---|---|---|---|---|---|
| A | $L_1$ | $R_1 = +0.65893$ | | | |
| | | $R_1' = -11.97527$ | $d_1 = 0.230703$ | 1.71300/53.85 | |
| | | | $s_{12} = 0.004837$ | | |
| B | $L_2$ | $R_2 = +0.51229$ | $d_2 = 0.125750$ | 1.78831/47.37 | Vgl. |
| | | $R_2' = +0.95812$ | | | |
| | | | $s_{23} = 0.048365$ | | |
| C | $L_3$ | $R_3 = -4.24885$ | $d_3 = 0.106404$ | 1.84666/23.82 | |
| | | $R_3' = +0.30077$ | | | |
| | | | $CS = s_{34} = 0.154769$ | | |
| | $L_4$ | $R_4 = +54.26597$ | $d_4 = 0.096731$ | 1.51009/63.52 | |
| D | | $R_4' = +0.55848$ | | | Hgl. |
| | | | $s_{45} = 0$ | | |
| | $L_5$ | $R_5 = +0.55848$ | $d_5 = 0.162024$ | 1.78831/47.37 | |
| | | $R_5' = -0.67818$ | | | | all linear dimensions being expressed in proportion to the equivalent focal length of the entire lens system considered as unity, the symbols having the meanings explained in the foregoing specification.

* * * * *